United States Patent
Yang et al.

(10) Patent No.: US 9,625,679 B2
(45) Date of Patent: Apr. 18, 2017

(54) CAMERA LENS

(71) Applicants: Liquan Yang, Shenzhen (CN);
Hiroyuki Teraoka, Shenzhen (CN)

(72) Inventors: Liquan Yang, Shenzhen (CN);
Hiroyuki Teraoka, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 15/082,113

(22) Filed: Mar. 28, 2016

(65) Prior Publication Data

US 2017/0038558 A1 Feb. 9, 2017

(30) Foreign Application Priority Data

Aug. 5, 2015 (JP) .................. 2015-154676

(51) Int. Cl.
*G02B 3/02* (2006.01)
*G02B 13/00* (2006.01)
*G02B 9/34* (2006.01)
*G02B 27/00* (2006.01)

(52) U.S. Cl.
CPC ............ *G02B 13/004* (2013.01); *G02B 9/34* (2013.01); *G02B 27/0025* (2013.01)

(58) Field of Classification Search
CPC .................................................. G02B 13/004
USPC ........................................................ 359/715
See application file for complete search history.

(56) References Cited

U.S. PATENT DOCUMENTS 7,177,098 B2 * 2/2007 Arai .................. G02B 27/0025
359/708

* cited by examiner

Primary Examiner — James Jones
(74) Attorney, Agent, or Firm — Na Xu; IPro, PLLC

(57) ABSTRACT

The present invention discloses a camera lens composed of 4 ultrathin and high-luminous flux wide angle lenses with excellent optical properties. The lenses are lined up in turn from the object side as follows: a first lens with positive refractive power, a second lens with negative refractive power, a third lens with positive refractive power, and a fourth lens with negative refractive power. The camera lens meets specific conditions.

3 Claims, 5 Drawing Sheets

CAMERA LENS

FIELD OF THE DISCLOSURE

The present invention discloses a camera lens, especially relates to the camera lens of small camera, optical sensor, mobile phone camera, WEB camera head etc. equipped with high pixel CCD, CMOS and other camera elements.

BACKGROUND

In recent years, a variety of cameras equipped with CCD, CMOS and other camera elements are widely available. Along with the miniature and high performance development of the camera elements, the camera lens composed of ultrathin and high-luminous flux F (Fno) wide-angle lenses with excellent optical properties is needed in market.

The technology related to the camera lens composed of 4 wide angle lenses with excellent optical properties, ultrathin, high-luminous flux f value (Fno) is developed step by step. The camera lens mentioned in the technological development proposal is composed of 4 lenses, lined up from the object side as follows: a first lens with positive refractive power, a second lens with negative refractive power, a third lens with positive refractive power and a fourth lens with negative refractive power.

The camera lens disclosed in embodiments 1-6 of JP Patent Publication No. 2015-034940 is composed of 4 lenses, but the distribution of refractive power of the first lens and the second lens is inadequate. The proportion of the axial distance between the image side of the second lens and the object side of the third lens to the overall focus distance of the camera lens is not proper, therefore the degree of wide-angle and ultrathin 2ω≤74.2°, Fno≥2.41 is not proper. Fno luminous flux is not sufficient.

The camera lens disclosed in embodiments 1-4 of JP Patent No. 5667323 is composed of 4 lenses, but the configuration of refractive power of the first lens is inadequate, the shape of the first lens is improper, therefore Fno=2.4 luminous flux is not sufficient.

Therefore, it is desired to provide a new camera lens which can overcome the aforesaid problem.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and exemplary embodiments thereof.

Figure 1:
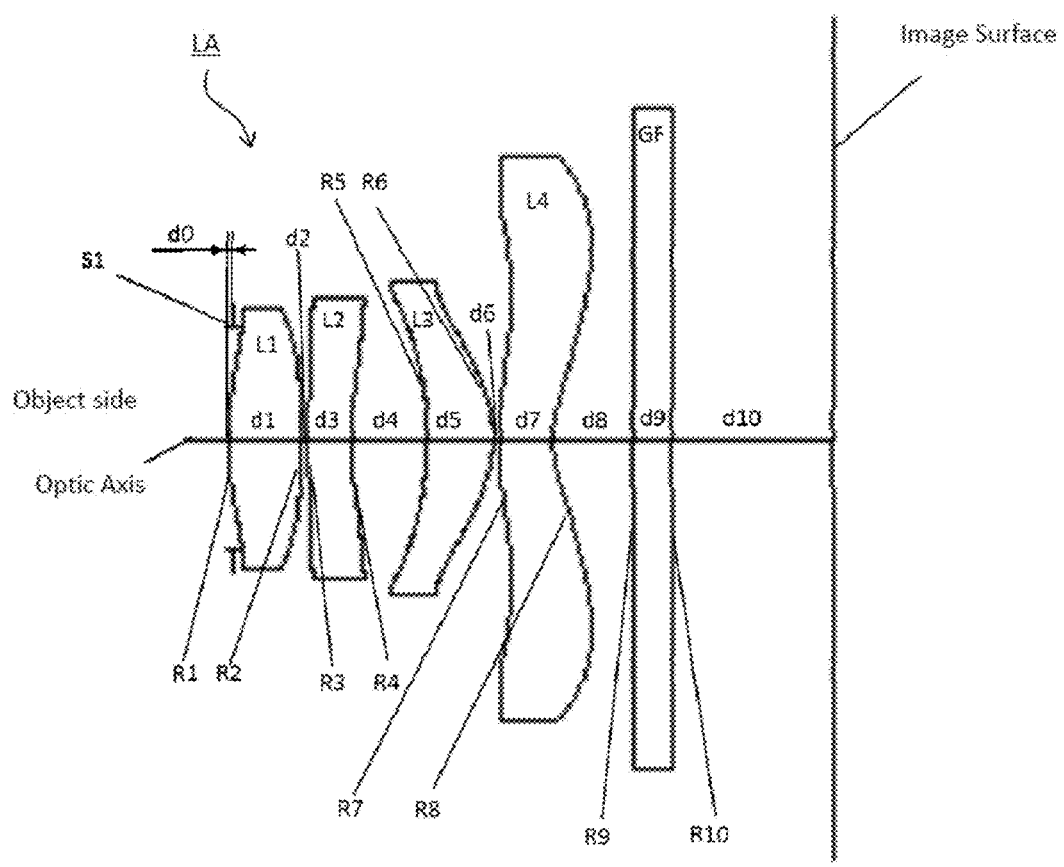
FIG. 1 is the structural diagram of the camera lens LA relevant in one embodiment of the present invention.

FIG. 1 shows the structural diagram of one embodiment of the camera lens of the present invention. The camera lens LA includes 4 lenses which are lined up in turn from the object side to the image side as follows: a first lens L1, a second lens L2, a third lens L3, as well as a fourth lens L4. A glass plate GF is provided between the fourthly lens L4 and the imaging plane. The glass plate GF is a cover glass, or a light filter having IR cut-off filtration and other functions, or the glass plate GF is not be provided between the fifth lens L5 and the imaging plane.

The first lens L1 has positive refractive power. The second lens L2 has negative refractive power. The third lens L3 has positive refractive power. The fourth lens L4 has negative refractive power. In order to correct aberration better, the surface of 4 lenses is designed to be non-spherical shape.

The camera lens LA meets following conditions (1)-(5):

$$0.90 \leq f1/f \leq 1.00 \quad (1)$$

$$-3.50 \leq f2/f \leq -2.00 \quad (2)$$

$$-0.80 \leq (R1+R2)/(R1-R2) \leq -0.30 \quad (3)$$

$$1.80 \leq (R3+R4)/(R3-R4) \leq 3.00 \quad (4)$$

$$0.15 \leq d4/f \leq 0.25 \quad (5)$$

In which:
f: The overall focal distance of the camera lens LA.
f1: The focal distance of the first lens.
f2: The focal distance of the second lens.
R1: The object side curvature radius of the first lens.
R2: The image side curvature radius of the first lens.
R3: The object side curvature radius of the second lens.
R4: The image side curvature radius of the second lens.
D4: The axial distance from the image side of the second lens to the object side of the third lens.

The condition (1) specifies the positive refractive power of the first lens L1. When exceeding the lower limit value of the condition (1), although in favor of the ultrathin development of the lens, the first lens L1 has too big positive refractive power, it is difficult to correct the aberration and other issues and also not conducive to wide-angle development of lens. On the contrary, when exceeding the upper limit value, the first lens has too small positive refractive power, it is difficult to the ultrathin development of lens.

The condition (2) specifies the negative refractive power of the second lens L2. When exceeding the lower limit value of the condition (2), the second lens has too small negative refractive power. It is difficult to correct the axial and abaxial chromatic aberration. On the contrary, when exceeding the upper limit value, the second lens has too big negative refractive power, on the one hand, it is difficult to correct the aberration and other issues, on the other hand, the higher aberration and the image side surface distortion issue caused by the axial misalignment of the second lens and other reasons will be increased.

The condition (3) specifies the shape of the first lens L1. If the value exceeds the limit of the condition (3), it is not conducive to Fno≤2.2 wide angle ultrathin development of the lens.

The condition (4) specifies the shape of the second lens L2. If the value exceeds the limit of the condition (4), it is not conducive to Fno≤2.2 wide angle ultrathin development of the lens.

The condition (5) specifies the proportion of the axial distance between the image side of the forth lens and the object side of the third lens to the overall focus distance of the camera lenses LA. If the value exceeds the limit of the condition (5), it is difficult to realize Fno≤2.2 wide angle and ultrathin development of lens.

Not only that, in LA camera lens, the third lens L3 has positive refractive power and meets the following condition (6).

$$0.50 \leq f3/f \leq 0.70 \quad (6)$$

In which:
f: The overall focal distance of the camera lens LA.
f3: The focal distance of the third lens.

The condition (6) specifies the negative refractive power of the third lens L3. When exceeding the lower limit value, the third lens has too big positive refractive power, and the higher aberration and the image side surface distortion issue caused by the axial misalignment of the third lens and other reasons will be increased. On the contrary, when exceeding the upper limit value, the third lens has too weak positive refractive power, and it is difficult to the ultrathin development of lens.

The fourth lens L4 has positive refractive power and meets the following condition (7)

$$-0.75 \leq f4/f \leq -0.55 \quad (7)$$

In which, f is the overall focal distance of the camera lens.
f4 is the focal distance of the fourth lens.

The condition (7) specifies the negative refractive power of the fourth lens L4. When exceeding the lower limit value, it is difficult to correct the abaxial chromatic aberration. When exceeding the upper limit value, the higher aberration and the image side surface distortion caused by the axial misalignment of the fourth lens and other reasons will be increased. This is detrimental to the camera lens.

As 4 lenses of the camera lens LA have the structure described previously and meet all conditions, the present invention discloses a camera lens composed of 4 Fno≤2.2 high-luminous flux lenses with the excellent optical properties, TTL (optical length)/IH (image height)≤1.5, ultrathin, wide-angle 2ω≥80°.

The camera lens LA of the present invention is described with the embodiments. The symbols in each embodiment are represented as follows (the unit of the distance, radius and center thickness is mm):
f: Overall focal distance of the camera lens LA.
f1: The focal distance of the first lens L1.
f2: The focal distance of the second lens L2.
f3: The focal distance of the third lens L3.
f4: The focal distance of the fourth lens L4.
Fno: F value.
2ω: full view angle.
S1: Open aperture.
R: Curvature radius of optical surface, Center curvature radius of the lens.

R1: The object side curvature radius of the first lens L1.
R2: The image side curvature radius of the first lens L1.
R3: The curvature radius of the object side of the second lens L2.
R4: The curvature radius of the image side of the second lens L2.
R5: The curvature radius of the object side of the third lens L3.
R6: The curvature radius of the image side of the third lens L3.
R7: The curvature radius of the object side of the fourth lens L4.
R8: The curvature radius of the image side of the fourth lens L4.
R9: The object side curvature radius of glass plate GF.
R10: The image side curvature radius of glass plate GF.
d: Center thickness of lenses or the distance between lenses.
d0: Axial distance from the open aperture S1 to the object side of the first lens L1.
d1: The center thickness of the first lens L1.
d2: The axial distance between the image side of the first lens L1 and the object side of the second lens L2.
d3: The center thickness of the second lens L2.
d4: The axial distance from the image side of the second lens L2 to the object side of the third lens L3.
d5: The center thickness of the third lens L3.
d6: The axial distance from the image side of the third lens L3 to the object side of the fourth lens L4.
d7: The center thickness of the fourth lens L4.
d8: The axial distance between the image side of the fourth lens L4 and the object side of the glass plate GF.
d9: The center thickness of the glass plate GF.
d10: The axial distance from the image side to the imaging plane of the glass plate GF.
nd: Refractive power of line d.
nd1: Refractive power of d line of the first lens L1.
nd2: Refractive power of d line of the second lens L2.
nd3: Refractive power of d line of the third lens L3.
nd4: Refractive power of d line of the fourth lens L4.
nd5: Refractive power of d line of glass plate GF.
v: Abbe number.
v1: Abbe number of the first lens L1.
v2: Abbe number of the second lens L2.
v3: Abbe number of the third lens L3.
v4: Abbe number of the fourth lens L4.
v5: Abbe number of the glass plate GF.
TTL: Optical length (the axial distance from the object side to the imaging plane of the first lens L1).
LB: The axial distance from the image side to the imaging plane of the fourth lens L4 (including the thickness of the glass plate GF).
IH: image height.

$$y=(x2/R)/[1+\{1-(k+1)(x2/R2)\}^{1/2}]+A4x4+A6x6+A8x8+A10x10+A12x12+A14x14+A16x16- \quad (8)$$

In which, R is the axial curvature radius. K is the cone constant. A4, A6, A8, A10, A12, A14, A16 are spherical coefficient.

As a matter of convenience, the aspheric surface of all lenses is an aspheric surface in condition (8), but not limited to the polynomial forms of the aspheric surface in the condition (8).

Embodiment 1

Figure 2:
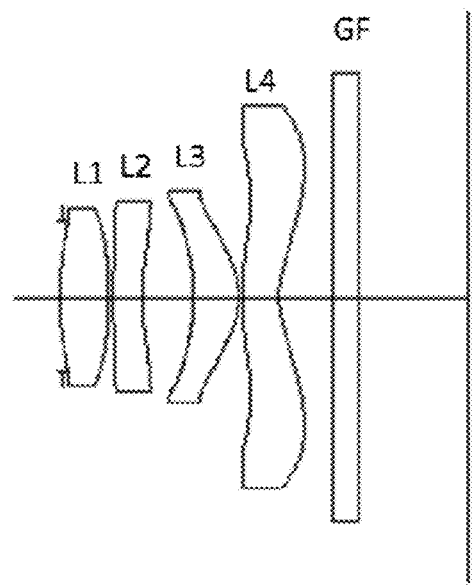
FIG. 2 is the structural diagram of the embodiment 1 of the camera lens LA.

FIG. 2 is the structure diagram of the camera lens LA in the embodiment 1. Table 1 shows the curvature radius R of the object side and the image side of the first lens L1 to the fourth lens L4, center thickness of the lenses or the distance d between lenses, refractive power nd and Abbe number v of the camera lens LA in the embodiment 1. The cone constant k and aspherical coefficients are shown in table 2.

TABLE 1

|  | R | d |  | nd |  | vd |
|---|---|---|---|---|---|---|
| S1 | ∞ | d0 = | −0.030 |  |  |  |
| R1 | 1.93624 | d1 = | 0.400 | n1 | 1.544 v1 | 56.1 |
| R2 | −4.51633 | d2 = | 0.037 |  |  |  |
| R3 | 6.99101 | d3 = | 0.237 | n2 | 1.651 v2 | 21.5 |
| R4 | 2.33034 | d4 = | 0.417 |  |  |  |
| R5 | −1.54504 | d5 = | 0.362 | n3 | 1.544 v3 | 56.1 |
| R6 | −0.59851 | d6 = | 0.030 |  |  |  |
| R7 | 2.08602 | d7 = | 0.298 | n4 | 1.544 v4 | 56.1 |
| R8 | 0.65967 | d8 = | 0.440 |  |  |  |
| R9 | ∞ | d9 = | 0.210 | n5 | 1.517 v5 | 64.2 |
| R10 | ∞ | d10 = | 0.881 |  |  |  |

TABLE 2

| | cone constant | aspherical coefficients | | | | | | |
|---|---|---|---|---|---|---|---|---|
| | k | A4 | A6 | A8 | A10 | A12 | A14 | A16 |
| R1 | −2.11E+00 | −6.22E−03 | −2.44E−01 | −1.01E+00 | 2.08E+00 | 1.27E+00 | −9.77E+00 | 8.18E+00 |
| R2 | −3.63E+02 | −4.42E−01 | 9.13E−02 | 6.33E−01 | −1.24E+00 | 1.38E−01 | 9.24E+00 | −1.47E+01 |
| R3 | −3.52E+01 | −1.61E−01 | −4.25E−01 | 9.44E−01 | 2.18E+00 | −1.45E+00 | −4.63E+00 | 2.76E+00 |
| R4 | −1.21E+01 | 3.28E−02 | −4.19E−01 | 2.15E−01 | 2.78E−02 | 7.50E−01 | 3.58E−01 | −1.99E+00 |
| R5 | −1.01E+01 | −1.04E−01 | −2.05E−02 | 1.08E−02 | −1.60E−01 | −1.52E−01 | 2.32E−01 | 5.66E−01 |
| R6 | −4.34E+00 | −2.39E−01 | 2.17E−01 | −2.02E−01 | 8.24E−02 | 2.03E−01 | 1.14E−01 | −4.33E−02 |
| R7 | −7.76E+00 | −1.85E−01 | 4.71E−02 | 9.04E−03 | −5.26E−03 | 7.15E−04 | 2.68E−04 | −2.54E−05 |
| R8 | −8.71E+00 | −8.42E−02 | 3.58E−03 | −5.59E−04 | 8.83E−04 | 3.06E−05 | −1.20E−04 | −3.16E−05 |

The values in the embodiments 1-2 and the corresponding values of the parameters specified in the conditions (1)-(7) are listed in following table 5.

As shown in table 5, the embodiment 1 meets the conditions (1)-(7).

Figure 3:
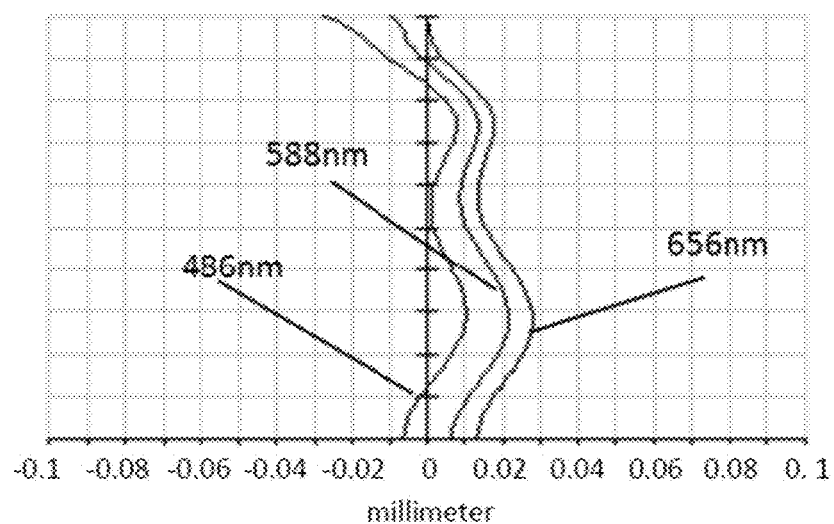
FIG. 3 is the diagram of the Longitudinal Aberration (axial chromatic aberration) of the camera lens LA in the embodiment 1.
Figure 4:
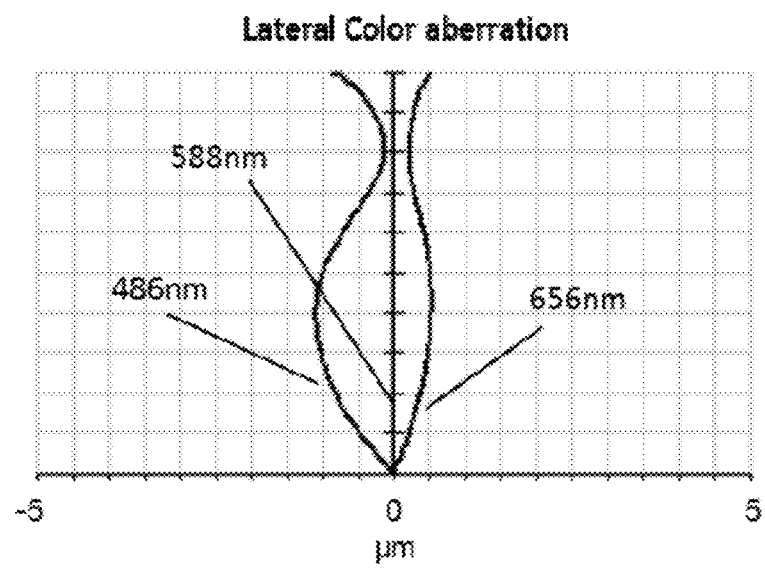
FIG. 4 is the diagram of the Lateral Color aberration of the camera lens LA in the embodiment 1.
Figure 5:
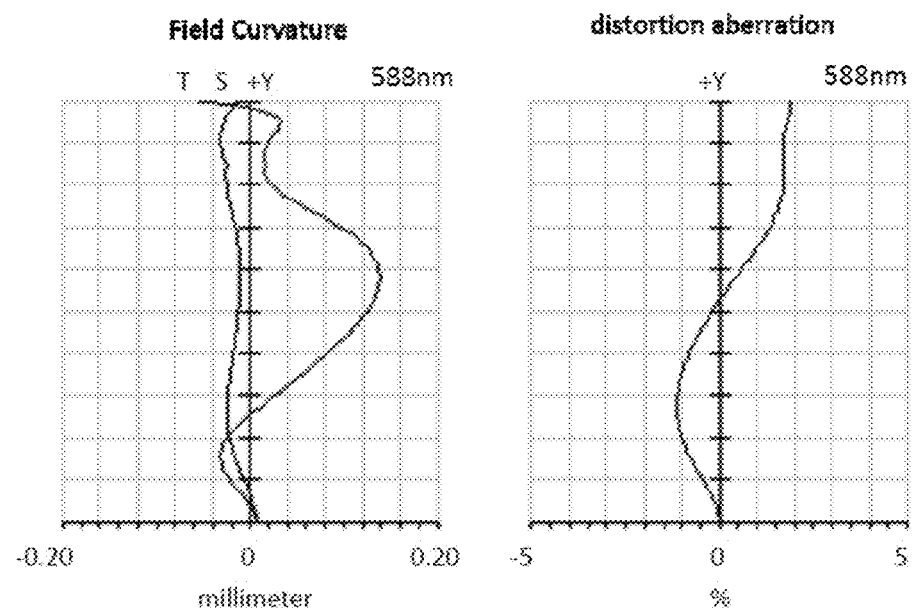
FIG. 5 is the diagram of the Field Curvature and distortion aberration of the camera lens LA in the embodiment 1.

FIG. 3 is the diagram of the Longitudinal Aberration (axial chromatic aberration) of the camera lens LA in the embodiment 1. FIG. 4 is the diagram of the Lateral Color aberration. FIG. 5 is the diagram of the Field Curvature and distortion aberration. In addition, the Field Curvature S in FIG. 5 is the Field Curvature relative to sagittal plane. T is the imaging plane curving relative to the tangent plane. It is same in embodiment 2. In embodiment 1, the camera lens LA is composed of high-luminous flux, wide-angle and ultrathin lenses, $2\omega=82.1°$, TTL/IH=1.440, Fno=2.10. As shown in FIGS. 3 to 5, it is easy to understand that it has excellent optical properties.

Embodiment 2

Figure 6:
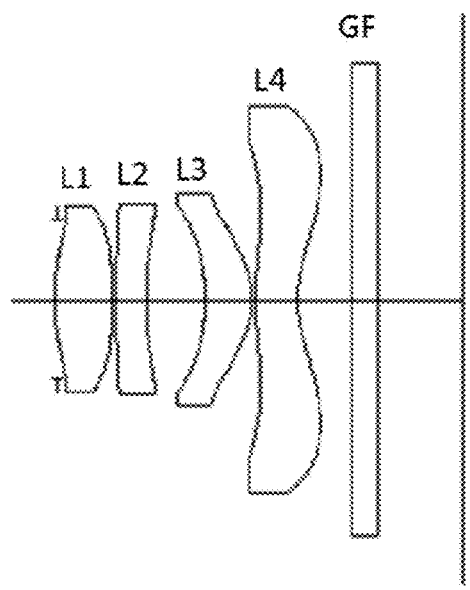
FIG. 6 is the structural diagram of the embodiment 2 of the camera lens LA.

FIG. 6 is the structural diagram of the camera lens LA in the embodiment 2. The curvature radius R of the object side and the image side of the first lens L1 to the fourth lens L4, center thickness of the lenses or the distance d between lenses, refractive power nd, Abbe number v of the camera lens LA in embodiment 2 are shown in table 3. The cone constant k and aspherical coefficients are shown in table 4.

TABLE 3

|  | R | d |  | nd |  | vd |
|---|---|---|---|---|---|---|
| S1 | ∞ | d0 = | −0.030 |  |  |  |
| R1 | 1.62389 | d1 = | 0.463 | n1 | 1.544 v1 | 56.1 |
| R2 | −7.63847 | d2 = | 0.037 |  |  |  |
| R3 | 5.64077 | d3 = | 0.237 | n2 | 1.651 v2 | 21.5 |
| R4 | 2.67188 | d4 = | 0.483 |  |  |  |
| R5 | −1.40591 | d5 = | 0.372 | n3 | 1.544 v3 | 56.1 |
| R6 | −0.61267 | d6 = | 0.030 |  |  |  |

TABLE 3-continued

|  | R | d |  | nd |  | vd |
|---|---|---|---|---|---|---|
| R7 | 2.74509 | d7 = | 0.331 | n4 | 1.544 v4 | 56.1 |
| R8 | 0.67838 | d8 = | 0.440 |  |  |  |
| R9 | ∞ | d9 = | 0.210 | n5 | 1.517 v5 | 64.2 |
| R10 | ∞ | d10 = | 0.690 |  |  |  |

TABLE 4

| | cone constant | aspherical coefficients | | | | | | |
|---|---|---|---|---|---|---|---|---|
| | k | A4 | A6 | A8 | A10 | A12 | A14 | A16 |
| R1 | −3.12E+00 | −1.13E−02 | −8.85E−02 | −1.14E+00 | 1.85E+00 | 1.30E+00 | −9.51E+00 | 6.49E+00 |
| R2 | −2.44E+03 | −5.79E−01 | 2.79E−01 | 4.76E−01 | −1.78E+00 | −4.53E−01 | 9.49E+00 | −1.15E+01 |
| R3 | 2.92E+00 | −1.35E−01 | −6.11E−01 | 9.22E−01 | 2.30E+00 | −1.27E+00 | −4.42E+00 | 3.06E+00 |
| R4 | −4.00E+00 | 7.17E−02 | −4.26E−01 | 2.45E−01 | 4.06E−02 | 8.14E−01 | 4.79E−01 | −1.93E+00 |
| R5 | −6.52E+00 | −1.49E−01 | −7.72E−02 | −3.09E−02 | −1.50E−01 | −9.51E−02 | 1.49E−01 | −2.61E−01 |
| R6 | −4.26E+00 | −2.37E−01 | 2.15E−01 | −1.01E−02 | 6.55E−02 | 1.72E−01 | 5.90E−02 | −1.41E−01 |
| R7 | −7.88E+00 | −1.86E−01 | 4.65E−02 | 8.57E−03 | −5.52E−03 | 6.91E−04 | 2.34E−04 | −8.40E−05 |
| R8 | −9.28E+00 | −8.59E−02 | 2.61E−03 | −9.12E−04 | 7.39E−04 | −3.59E−05 | −1.43E−04 | −3.52E−05 |

As shown in table 5, the embodiment 2 meets the conditions (1)-(7).

Figure 7:
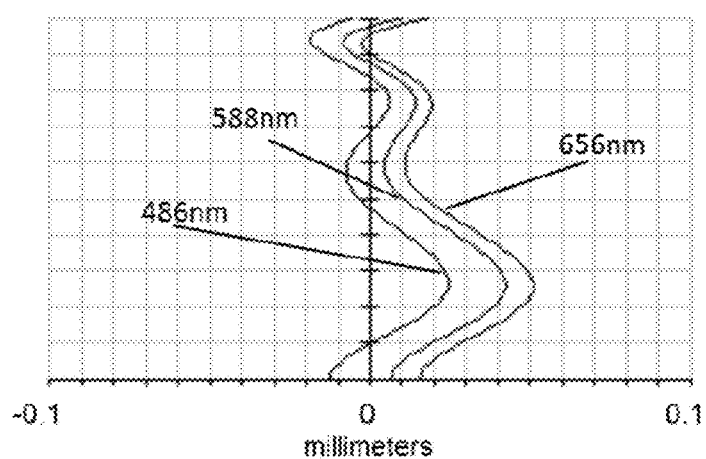
FIG. 7 is the diagram of the Longitudinal Aberration (axial chromatic aberration) of the camera lens LA in the embodiment 2.
Figure 8:
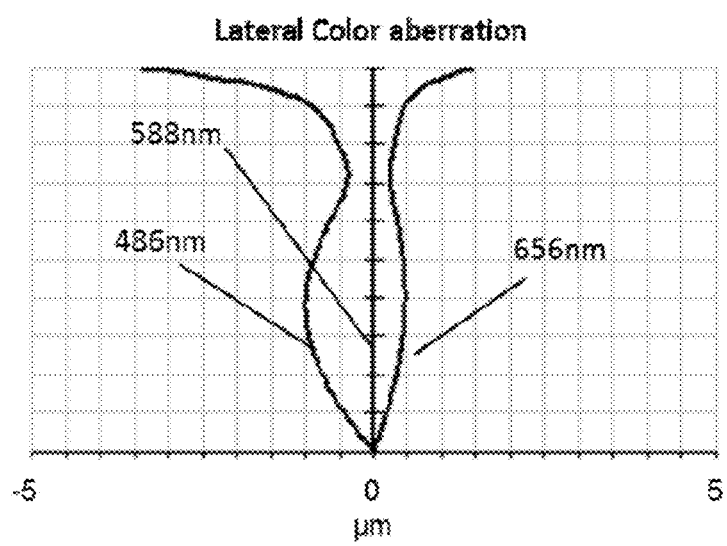
FIG. 8 is the diagram of the Lateral Color aberration of the camera lens LA in the embodiment 2.
Figure 9:
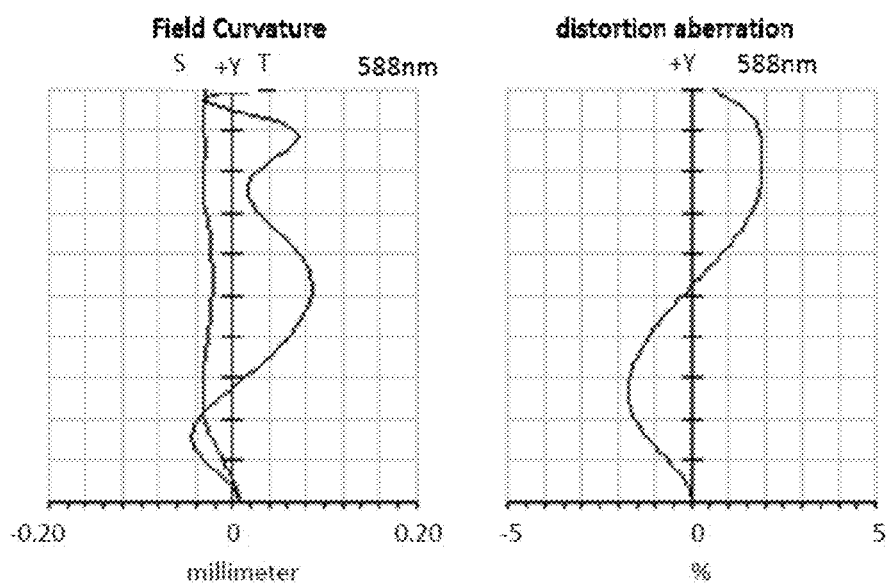
FIG. 9 is the diagram of the Field Curvature and distortion aberration of the camera lens LA in the embodiment 2.

FIG. 7 is the diagram of the Longitudinal Aberration (axial chromatic aberration) of the camera lens LA in the embodiment 2. FIG. 8 is the diagram of the Lateral Color aberration. FIG. 9 is the diagram of the Field Curvature and distortion aberration. As shown in FIG. 7-9, in the embodiment 2, the camera lens LA is composed of ultrathin, high-luminous flux wide-angle lenses, full image angle 2ω=81.0°, TTL/IH=1.432, Fno=2.10. It is easy to understand that the camera lens has excellent optical properties.

The values of the embodiments and the corresponding values of the parameters specified in the condition expressions (1) to (7) are listed in table 5. In addition, the unit in table 7 are respectively 2ω(°), f (mm), f1 (mm), f2 (mm), f3 (mm), f4 (mm), TTL (mm), LB (mm) and IH (mm).

TABLE 5

|  | Embodiment 1 | Embodiment 2 | Condition |
|---|---|---|---|
| f1/f | 0.980 | 0.933 | (1) |
| f2/f | −2.109 | −3.000 | (2) |
| (R1 + R2)/(R1 − R2) | −0.400 | −0.649 | (3) |
| (R3 + R4)/(R3 − R4) | 2.000 | 2.800 | (4) |
| d4/f | 0.160 | 0.180 | (5) |
| f3/f | 0.609 | 0.638 | (6) |
| f4/f | −0.736 | −0.654 | (7) |
| Fno | 2.10 | 2.10 |  |
| 2ω | 82.1 | 81.0 |  |
| f | 2.599 | 2.684 |  |
| f1 | 2.546 | 2.505 |  |
| f2 | −5.480 | −8.052 |  |
| f3 | 1.582 | 1.713 |  |
| f4 | −1.914 | −1.755 |  |
| TTL | 3.312 | 3.293 |  |
| LB | 1.531 | 1.340 |  |
| IH | 2.300 | 2.300 |  |
| TTL/IH | 1.440 | 1.432 |  |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. A camera lens, comprising, lined up in turn from the object side:
   a first lens with positive refractive power;
   a second lens with negative refractive power;
   a third lens with positive refractive power;
   a fourth lens with negative refractive power;
   wherein the camera lens satisfies the conditions as follows:

$0.90 \leq f1/f \leq 1.00$, $-3.50 \leq f2/f \leq -2.00$, $-0.80 \leq (R1+R2)/(R1-R2) \leq -0.30$, $1.80 \leq (R3+R4)/(R3-R4) \leq 3.00$, $0.15 \leq d4/f \leq 0.25$, where, f is the overall focal distance of the camera lens;
   f1 is the focal distance of the first lens;
   f2 is the focal distance of the second lens;
   R1 is the object side curvature radius of the first lens;
   R2 is the image side curvature radius of the first lens;
   R3 is the object side curvature radius of the second lens;
   R4 is the image side curvature radius of the second lens; and
   D4 is the axial distance from the image side of the second lens to the object side of the third lens.
2. The camera lens as described in claim 1 further satisfying the following conditions:

$0.50 \leq f3/f \leq 0.70$ where, f is the overall focal distance of the camera lens, and f3 is the focal distance of the third lens.
3. The camera lens as described in claim 1 further satisfying the following conditions:

$-0.75 \leq f4/f \leq -0.55$ where, f is the overall focal distance of the camera lens, and f4 is the focal distance of the fourth lens.

* * * * *